Patented June 15, 1937

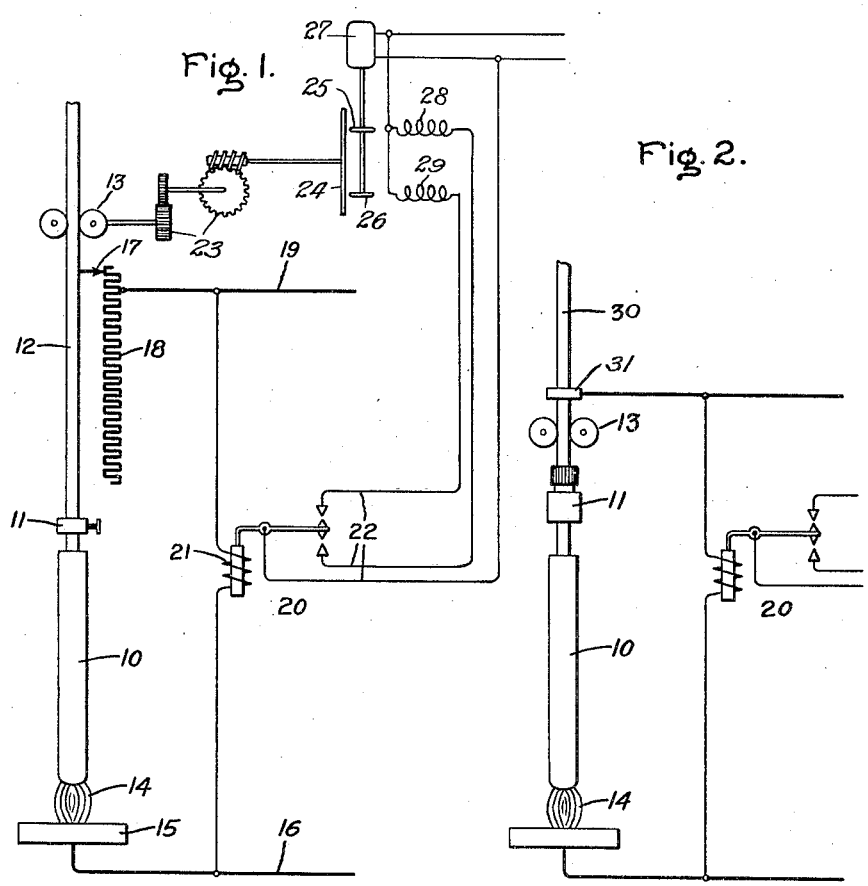

2,084,168

UNITED STATES PATENT OFFICE 2,084,168

ARC WELDING APPARATUS

Erwin Thiemer, Hennigsdorf, Germany, assignor to General Electric Company, a corporation of New York Application May 29, 1936, Serial No. 82,586
In Germany June 8, 1935

4 Claims. (Cl. 219—8)

My invention relates to arc welding apparatus for automatically feeding short length electrodes.

In order to improve the arcing characteristics of electrodes, as well as the qualities of the metals deposited thereby, heavy flux coatings are frequently applied to the electrodes. These electrodes are commonly supplied in short lengths having one end bared of flux for connection to one terminal of a source of welding current.

When such an electrode has an appreciable length, say from 18 to 24 inches, and when relatively high welding currents are employed, there is of necessity an appreciable voltage drop between the two ends of the electrode. This drop changes as the electrode is consumed. When the arc is first struck the resistance of the electrode increases quite rapidly due to the temperature rise caused by the current flowing through the electrode. During welding the resistance of the electrode consequently reaches a maximum value and then begins to decrease as the electrode is consumed and becomes shorter.

In automatic arc welding machines adapted for feeding short length electrodes the voltage responsive device used for controlling the feed of the electrode is connected across the electrode and the arc maintained at its arcing terminal, and the variation in voltage drop in the electrode which changes with the length of the electrode materially affects the arc voltage maintained by the feeding means under the control of the voltage responsive device. Because of the drop in voltage in the electrode, the arc voltage is a minimum when the welding operation is started with a new electrode, increases for a short time, and then gradually decreases with the consumption of the electrode. The voltage responsive device of such machines does not, consequently, maintain an arc of substantially uniform voltage during a welding operation.

It is an object of my invention to provide means for compensating for the changes in voltage drop in short length electrodes fed by automatic arc welding machines so that the voltage responsive devices of such machines are enabled to control the feed of the electrodes in a manner to maintain a substantially uniform arc voltage during welding.

My invention will be better understood from a consideration of the two embodiments thereof diagrammatically illustrated in Figs. 1 and 2 of the drawing.

In Fig. 1, one end of an electrode 10 is clamped in an electrode holder 11 having a feed rod 12 which extends between and is engaged by feed rolls 13. An arc 14 is maintained between the other end of the electrode 10 and the work to be welded 15. Current is supplied to the arc 14 through the following circuit; from a source of welding current through conductor 16, work 15, arc 14, electrode 10, feed rod 12, contact 17, resistance 18, and conductor 19 back to the source of welding current. A voltage responsive device 20 has its operating coil 21 connected across the arc 14, the electrode 10, and resistance 18. In the arrangement illustrated the voltage responsive device has been illustrated as a contact making voltmeter which by controlling circuits through conductors 22 controls the speed and direction of rotation of the feed rolls 13. The voltmeter may form a part of any suitable control. It may be part of a system such as shown in United States Letters Patent 1,541,582, Wilbur L. Merrill, granted June 9, 1925. With such a control the feed rolls 13 are rotated through a reduction gearing 23 and a transmission involving a disc 24 and rolls 25 and 26 by a feed motor 27 connected to a source of supply which through conductors 22 and the contacts of voltmeter 20 energizes coils 28 and 29 to control the engagement of these rolls 25 and 26 with disc 24 and thus the direction and rate of feed of the electrode by feed rolls 13.

It will be noted that as the electrode 10 is consumed in the arc 14, the contact 17 attached to feed rod 12 will move along the resistance 18 varying the amount of this resistance in circuit with the electrode. In the arrangement shown the amount of resistance is decreased from a small amount to zero, to take care of the initial increase in resistance of the electrode due to heating and is thereafter increased to compensate for the decreasing resistance of the electrode 10, which during the welding operation is becoming shorter and shorter. The total voltage drop, however, across the resistance 18 and electrode 10 is substantially constant, and since the voltage responsive device is connected across resistance 18, electrode 10 and arc 14 and acts to maintain their total voltage drop substantially constant, the voltage drop across the arc 14 will also be maintained substantially constant throughout the welding operation.

In the arrangement illustrated in Fig. 2, one end of the electrode 10 is supported in a holder 11 having a feed rod 30, the resistance per unit length of which is substantially the same as the resistance per unit length of the electrode 10. Current is supplied to the electrode 10 through a contact 31 which engages the feed rod 30. As in Fig. 1, the electrode 10 and feed rod 30 are fed relatively to the contact 31 by feed rolls 13, the speed and direction of which are controlled by the voltage responsive device 20. As the electrode 10 is consumed and the voltage drop across it becomes less and less, more and more of the feed rod 30 is placed in circuit with the electrode and the increased voltage drop in the feed rod 30 compensates for the decreased voltage drop in the electrode 10. With this arrangement the voltage responsive device connected across the arc 14, electrode 10 and feed rod 30 operates to maintain a substantially uniform voltage across the arc, since the total voltage drop through the electrode 10 and feed rod 30 is substantially constant.

As has been noted above, because of the heating of the electrode and its increase in resistance due to this factor, the resistance of the electrode does not at first decrease in exact correspondence with its consumption during welding and if the resistance changes due to this heating effect is material, it may be neutralized by properly proportioning the cross section of the feed rod 30 or by making it of materials of different electrical conductivity so that a complete compensation for changes in voltage drop in the electrode may be furnished by a proper decrease and increase in voltage drop in the feed rod 30 as the welding operation progresses and the electrode is consumed.

My invention is not limited in its application to automatic machines used for feeding heavily coated electrodes although it is expected to be of greatest utility for this purpose. It may be used for feeding bare or lightly coated electrodes to improve the voltage regulation of the welding arc and thus the quality of the weld metal deposited. Furthermore the entire electrode is not necessarily included in the welding circuit, for my invention is equally effective for feeding electrodes to which the welding current is supplied through a length thereof by contact means attached to the electrode at a substantial distance from its arcing terminal.

What I claim as new and desire to secure by Letters Patent of the United States is:

1. Arc welding apparatus comprising means for supplying welding current through the full length of a welding electrode to an arc at its arcing terminal, means in series circuit with said electrode for compensating for the change in voltage drop in said electrode with its consumption during welding, a voltage responsive device connected across said arc, said electrode and said compensating means, and means controlled by said voltage responsive device for feeding said electrode and for operating said compensating means.

2. Arc welding apparatus comprising a welding circuit, a resistance connected in said welding circuit in series with that portion of an electrode consumed during welding, a voltage responsive device connected across said resistance, said electrode, and the arc maintained at the arcing terminal of said electrode, means under the control of said voltage responsive device for feeding said electrode to compensate for its consumption during welding, and means for varying said resistance in response to the movement of said electrode to produce during welding a substantially uniform voltage drop across said resistance and the unconsumed portion of said electrode.

3. Arc welding apparatus comprising a resistance connected in series with that portion of an electrode consumed during welding, means for supplying welding current through said resistance and said electrode to its arcing terminal, a contact making voltmeter connected across said resistance, said electrode, and the arc maintained at the arcing terminal of said electrode, means including said voltmeter for feeding said electrode toward the work to compensate for its consumption in the arc, and means responsive to the movement of said electrode for varying said resistance and for producing during welding a substantially uniform total voltage drop across said resistance and said electrode.

4. Arc welding apparatus comprising an electrode holder having an extended conductive portion the resistance per unit length of which is substantially the same as the resistance per unit length of an electrode one end of which is supported in said holder, means for supplying welding current to said electrode through said conductive portion of said holder, means for feeding said electrode and said conductive portion of said holder relative to said current supplying means toward the work to be welded to compensate for the consumption of said electrode during welding, and means including a voltage responsive device the terminals of which are connected to said current supplying means and to said work, for controlling said feeding means.

ERWIN THIEMER.